Sept. 19, 1961

L. J. HOOG 3,000,063

SAFETY GATE

Filed Dec. 16, 1959

INVENTOR
Lawrence J. Hoog

BY
Wilkinson, Mawhinney & Theibault
ATTORNEYS

Sept. 19, 1961     L. J. HOOG     3,000,063
SAFETY GATE

Filed Dec. 16, 1959     2 Sheets-Sheet 2

INVENTOR
Lawrence J. Hoog

BY Wilkinson, Mawhinney & Theibault
ATTORNEYS

United States Patent Office 3,000,063
Patented Sept. 19, 1961

3,000,063
SAFETY GATE
Lawrence John Hoog, 1001 E. Lincoln St., Bloomington, Ill.
Filed Dec. 16, 1959, Ser. No. 859,956
6 Claims. (Cl. 20—71)

The present invention relates to safety gate and has for an object to provide a portable self-contained gate constructed and arranged to be set up temporarily in selected locations in a house to block off passages for various purposes, for instance, to keep a child or pet safe from stairways, basement steps, or to confine them to any designated room in a house.

Another object of the invention is to provide a safety gate which can be installed substantially instantaneously without the use of nails, screws or other fastenings but merely by expanding one or more slide panels through enclosed tamper-proof mechanism operable by a crank or other removable implement so that after setting the gate in place and removing the implement, the mechanism will not be accessible for unauthorized operation.

A further object of the invention is to provide tightness in the gate when installed with resilient reactive pressure to assist in forestalling dislodgment of the gate while at the same time providing for avoiding marring of any woodwork engaged by the panels.

It is a still further object of the invention to provide for ease in the removal of the gate and compactness in the construction and mechanism for ease in carrying about in the hand and for compactness in storing.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings, the gate of this invention comprises generally a central gate body 10 and one or more slidable end panels 11, 12.

Figure 4:
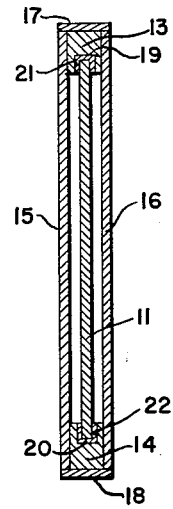
FIGURE 4 is a vertical cross sectional view taken on the line 4—4 in FIGURE 3.

For convenience in construction, transportation and storage the central gate body may comprise upper and lower longitudinal beams 13, 14 and spaced side central panels 15, 16, affixed to the outer sides of the beams 13, 14, as most clearly seen in FIGURE 4 by adhesive nails, screws or other appropriate fastenings. One at least of these panels 15, 16 may be removable to give access to the internal space confined generally between the beams and the central panels 15, 16, which space is open at its ends to permit of the sliding movement therethrough of the slide panels 11, 12.

Top and bottom strips 17, 18 may be affixed in any suitable manner to the upper and lower ends respectively of the beams 13 and 14 in a manner to overlap the upper and lower edges of the central stationary panels 15, 16.

In the upper and lower beams 13, 14 are upper and lower guideways 19, 20 which open into the central enclosed space in the gate body, such guideways being for the purpose of accommodating the upper and lower edges of the slide end panels 11, 12. Preferably these guideways 19, 20 are reinforced by upper and lower channel tracks 21, 22. The channel tracks are preferably of metal fitted in the guideways to protect the beams 13, 14 which will probably be usually made of wood.

Figure 3:
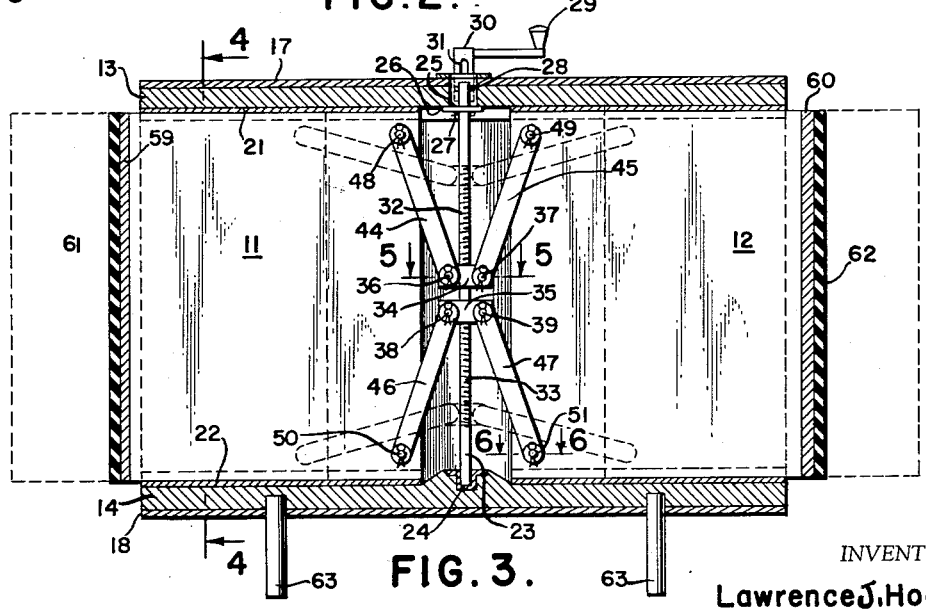
FIGURE 3 is a longitudinal vertical section taken through the gate on the line 3—3 in FIGURE 2.
Figure 7:
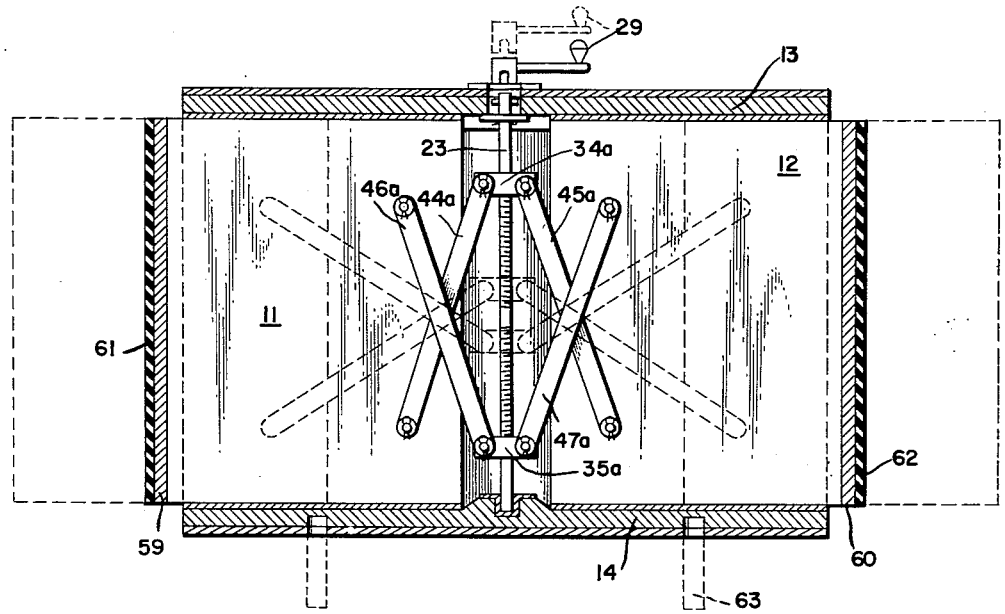
FIGURE 7 is a view similar to FIGURE 3 showing a modification.

Within the enclosed space is journalled an operating shaft 23 having its lower end fitted rotatably into a lower step bearing 24 with its upper end projecting into a recess 25 which opens through the top of the gate body. A washer 26 is fitted about the upper end portion of the shaft 23 just below the recess 25, and a cotter pin or key 27 is passed through the shaft 23 just below the washer 26 in order to hold the washer up against the lower surface of the beam 13, the washer 26 being of greater diameter than the recess 25 as best seen in FIGURES 3 and 7.

Lateral pins 28 project from the upper portion of the operating shaft 23 which is housed within the recess 25, such pins being adapted to be engaged by socket slots 31 in a crank socket 30 having a crank handle 29. This enables the crank to be fitted removably to the upper end of the operating shaft 23 and provides an implement for rotating the shaft 23 in one or the other direction accordingly as it is desired to project the slide panels 11, 12 outwardly or to retract the same. The crank handle is removable after the adjustment of the slide panels has been made.

The operating shaft 23 is provided with oppositely threaded sections 32, 33, that is, right- and left-hand threads to which are respectively fitted similarly tapped upper and lower nut blocks 34, 35. Dowels 36, 37 and 38, 39 are fitted to the blocks 34, 35 and project outwardly therefrom as shown in FIGURE 5 with respect to the nut block 34, the companion lower nut block 35 being similarly equipped.

Figure 5:
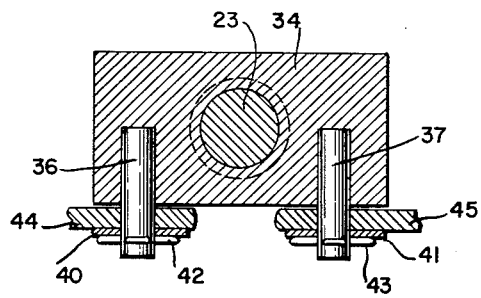
FIGURE 5 is a horizontal cross sectional view taken on a much magnized scale on the line 5—5 in FIGURE 3.

As shown in this FIGURE 5, washers 40 and 41 are fitted over the dowels 36, 37 and are held in place by cotter keys 42, 43 with the lower ends of upper links 44, 45 fitted about the dowels 36, 37 between the block 34 and the washers 40, 41.

The lower block 35 is similarly equipped to pivotally receive the upper ends of lower links 46, 47. The upper ends of the links 44, 45, as best seen in FIGURE 3, are pivoted to dowels or screws 48, 49 on upper inner portions of the slide panels 11, 12; while the lower ends of the lower links 46, 47 are similarly pivotally connected with dowels or screws 50, 51 projecting out from inner portions of the slide panels 11 and 12.

Figure 6:
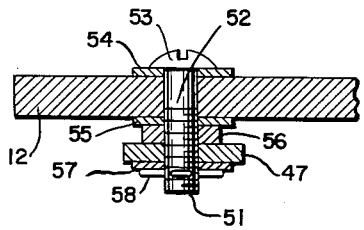
FIGURE 6 is a similar horizontal magnified sectional view taken on the line 6—6 also in FIGURE 3.

These various dowels or screws 48, 49, 50, 51 are shown in enlarged section in FIGURE 6, the screw shanks being designated at 52 and the screw heads at 53, the shanks 52 being passed through openings in the panels 11, 12 with washers 54 interposed between the screw heads 53 and the adjacent faces of the slide panels. Washers 55 are fitted over the shanks 52 and moved up against the opposite faces of the slide panels and against these washers 55 are abutted spacers 56 while the links 47, as appearing in FIGURE 6, are fitted over the shanks 52 and against the spacers 56. Washers 57 confine the outer portions of the links 47 and the whole assembly is held together, for instance, by cotter keys 58.

The slide panels 11, 12 carry at their outer ends end heads 59, 60 which are preferably faced with rubber or other resilient compressible pads 61, 62.

Feet 63 may or may not be provided for the central gate body.

Figure 1:
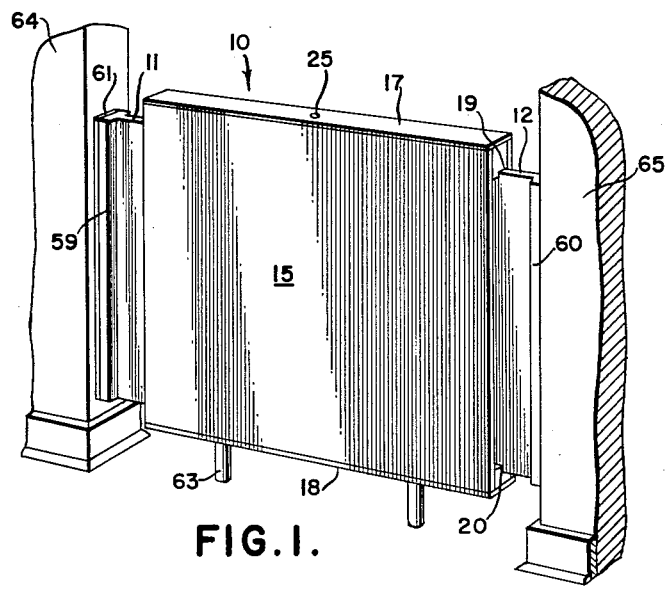
FIGURE 1 is a isometric view of a safety gate according to the invention with the slide panels projected into installed position upon woodwork abutments illustrated in part only and in part broken away and in section.

In FIGURE 1 at 64 and 65 are represented woodwork abutments of the house defining a passageway where it is convenient to install the safety gate, although the same may be fitted to plaster walls or in other environment.

Referring more particularly to FIGURE 7, nut blocks 34a and 35a are fitted to the reversely formed screw threaded sections of the operating shaft 23 and links 44a, 45a and 46a and 47a are connected pivotally between the blocks and the slides 11, 12 in the manner illustrated in this FIGURE 7 in which the links 44a and 46a and 45a and 47a cross one another.

Figure 2:
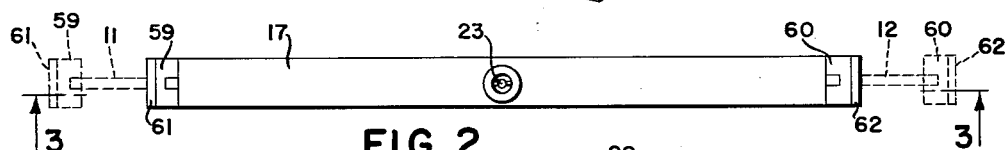
FIGURE 2 is a top plan view of the improved gate on a somewhat enlarged scale.

In the use of the device the slide panels 11, 12 will ordinarily be retracted within the space encompassed by the central gate body with the exception that the end heads 59 and 60 will be wider than the open ends of the enclosed space so that these end heads 59, 60 form limit stops for abutting against the end edges of the central stationary panels 15, 16. The retracted position of the parts is shown in FIGURES 2, 3 and 7 with the expanded position of the slide panels 11, 12 illustrated in dotted lines. Similarly in FIGURES 3 and 7 the various links are illustrated in full lines in the retracted position of the slide panels 11, 12 and in dotted lines in the expanded positions of these slide panels.

In installing the gate the same, with the slide panels 11, 12 retracted, is brought to location, as for instance, between the woodwork members 64, 65, the crank member 29, 30 is then applied through the upper open end of the recess 25 to the upper end of the operating shaft 23 and into interlocking engagement with the pins 28 thereof, the crank being thereupon rotated in the appropriate direction, for instance, in FIGURE 3 to cause the nut blocks 34, 35 which are located close together in a central part of the shaft 23 in the retracted position of the slides 11, 12 to move away from one another respectively up and down upon the rotating shaft 23, thus causing the links 44, 45 and 46, 47 to spread out in the act of pushing the slide panels 11, 12 apart and outwardly against the woodwork 64, 65 which is only contacted by the pads 61, 62.

In the case of FIGURE 7 it will be noted that the retracted positions of the nut blocks 34a and 35a are at upper and lower end portions respectively of the reversely threaded sections of the operating shaft 23 and that as the shaft is rotated in a preselected direction these blocks 34a and 35a will be caused to travel axially along the screw threaded portions toward one another until when the blocks arrive in close proximity the slide panels 11, 12 will be projected to an outermost position where their padded heads 59, 60 will tightly engage the abutments.

It will be noted particularly from FIGURES 3 and 7 that the pads 61, 62 are of substantial thickness and being resilient and compressible they will be subjected to distortion incident to the pressure applied through the screw operating shaft and nut blocks. They will thus engage without injury to the woodwork against the abutments in a manner incapable of dislodgment until withdrawn by reapplication of the crank or other implement in the act of rotating the shaft 23 in the opposite direction. When in the applied position these pads 61, 62 are productive of reactive thrust forces tending to push the slides 11, 12 inwardly, but the slides are firmly locked by the screw threaded association between the operating shaft 23 and its nut blocks whereby this reactive force is in addition to the screw pressure.

After installing the device the operator will remove the crank and place it without the reach of children whereby the safety gate will remain as an effective barrier until an authorized person with the use of the crank removes the same.

Although I have disclosed herein the best forms of the invention known to me at this time, I reserve the right to all such modifications and changes as may come within the scope of the following claims.

What is claimed is:

1. In a safety gate, a central gate body comprising upper and lower spaced substantially parallel beams, upper and lower alined channel tracks in said beams, front and rear panels placed against opposite front and rear faces of the beams and secured thereto to form an internal space between the beams and front and rear panels with the outer ends of said internal space freely open, at least two end panels having upper and lower edges slidably fitted in said alined channel tracks and movable through the freely open ends of said internal space, end heads on the outer ends of the end panels, an upright screw shaft journaled between the adjacent inner ends of the end panels in the upper and lower beams and having oppositely threaded sections, upper and lower nut blocks on the sections threaded correspondingly to the opposite threads of the sections to produce movement of the blocks together or apart incident to rotary movements of the screw shaft in opposite directions, means for rotating the shaft, and pairs of links pivoted to the blocks and to the inner end portions of the end panels for converting the vertical movements of the blocks into horizontal sliding movements of the end panels to expand and contract the safety gate.

2. A safety gate as claimed in claim 1 in which said pairs of links diverge from the nut blocks upwardly and downwardly in opposite directions in all positions of the nut blocks.

3. A safety gate as claimed in claim 2 in which a link of each pair is pivoted to upper and lower inner end portions respectively of a panel whereby to counteract end thrust of the links on each end panel to prevent jamming of the panel in the channel tracks.

4. A safety gate as claimed in claim 3 in which the pair of links pivoted to the upper nut block diverge upwardly and are connected to inner upper portions of the end panels while the other pair of links diverge downwardly from the lower nut block and are pivoted to inner lower portions of the end panels.

5. A safety gate as claimed in claim 3 in which the pair of links pivoted to the upper block diverge downwardly and are pivoted to inner lower portions of the end panels while the pair of links pivoted to the lower nut block diverge upwardly in crossed relation to the last-mentioned links and are pivoted to inner upper portions of the end panels.

6. A safety gate as claimed in claim 1 in which said pairs of links are pivoted to the nut blocks at one side thereof and overlap the sides of the end panels, said channel tracks being narrower than the beams whereby at least one of the front or rear panels is spaced from the end panels to accommodate the links.

References Cited in the file of this patent

UNITED STATES PATENTS

| | | |
|---|---|---|
| 2,559,066 | Diefenbronn | July 3, 1951 |
| 2,698,753 | Kellman et al. | Jan. 4, 1955 |
| 2,896,277 | Halligan | July 28, 1959 |

FOREIGN PATENTS

| | | |
|---|---|---|
| 156,535 | Germany | Nov. 23, 1904 |